US011068471B2

(12) United States Patent
Esposito et al.

(10) Patent No.: US 11,068,471 B2
(45) Date of Patent: *Jul. 20, 2021

(54) SYSTEMS AND METHODS FOR MANAGING DATA TRANSFERS OVER A NETWORK

(71) Applicant: The Toronto-Dominion Bank, Toronto (CA)

(72) Inventors: Helene Esposito, Toronto (CA); Paul Mon-Wah Chan, Toronto (CA); John Jong Suk Lee, Toronto (CA); Rakesh Thomas Jethwa, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 223 days.

This patent is subject to a terminal disclaimer.

(21) Appl. No.: 16/289,707

(22) Filed: Mar. 1, 2019

(65) Prior Publication Data
US 2019/0197033 A1 Jun. 27, 2019

Related U.S. Application Data

(63) Continuation of application No. 15/285,648, filed on Oct. 5, 2016, now Pat. No. 10,261,948.

(51) Int. Cl.
*G06F 16/23* (2019.01)
(52) U.S. Cl.
CPC ...... *G06F 16/2379* (2019.01); *G06F 16/2322* (2019.01)
(58) Field of Classification Search
None
See application file for complete search history.

(56) References Cited

U.S. PATENT DOCUMENTS

| 5,978,780 A | 11/1999 | Watson |
| 7,693,771 B1 | 4/2010 | Zimmerman et al. |
| 2010/0005024 A1 | 1/2010 | Schmitz et al. |
| 2010/0217706 A1 | 8/2010 | Griffin et al. |
| 2010/0306094 A1 | 12/2010 | Homer et al. |
| 2013/0325707 A1 | 12/2013 | Joa et al. |
| 2014/0012746 A1 | 1/2014 | Hanson et al. |

(Continued)

OTHER PUBLICATIONS

Recurring Bill Payments | Pay Monthly Bills Automatically | MasterCard, printed Oct. 5, 2016.

(Continued)

*Primary Examiner* — Amresh Singh
(74) *Attorney, Agent, or Firm* — Rowand LLP

(57) ABSTRACT

A method for managing transfer of data over a network to a recipient system is disclosed. The method is implemented at a database management system that stores a schedule of data transfers associated with records in a database. The method includes: receiving a signal representing an electronic message from a third party system, the electronic message including details of a first scheduled data transfer to a first record in the database at a first transfer time; obtaining details of a second scheduled data transfer from the first record to the recipient system; determining that an effect on the first record by the first and second scheduled data transfers meets stored predefined criteria; updating the schedule of data transfers to change a second transfer time associated with the second scheduled data transfer; and initiating the second scheduled data transfer according to the updated schedule of data transfers.

20 Claims, 4 Drawing Sheets

(56) References Cited

U.S. PATENT DOCUMENTS

2014/0188737 A1    7/2014   Salah et al.
2015/0032611 A1    1/2015   Crowley et al.
2016/0300204 A1   10/2016   Guido et al.

OTHER PUBLICATIONS

Set up Automatic Bill Payments, printed Oct. 5, 2016.
Triggered Payments, printed Oct. 5, 2016.
USPTO, Office Action relating to U.S. Appl. No. 15/285,648 dated Oct. 5, 2018.

| Schedule – Account1 | | |
| --- | --- | --- |
| Date | Recipient | Amount |
| 1/1/2017 | RID1 | $120.00 |
| 1/3/2017 | RID2 | $45.00 |

SYSTEMS AND METHODS FOR MANAGING DATA TRANSFERS OVER A NETWORK

RELATED APPLICATIONS

This application claims priority to U.S. patent application Ser. No. 15/285,648 filed on Oct. 5, 2016, the entirety of which is incorporated herein by reference.

FIELD

The present application generally relates to database management and, more particularly, to systems and methods for managing data transfer timing in a database.

BACKGROUND

Databases are used for numerous purposes and, in some instances, a database is configured to allow for a transfer from one record in the database to another record in that database or another database. For example, a database may be configured such that a value is stored in a record and that value may be increased when a transfer from another record (which may be in the same database or another database) is received. Similarly, the value may be decreased by transferring a portion of the value to another record (which may be in the same database or another database). For example, the value may represent an account balance and the balance may be increased or decreased based on transfers into and out of the account.

Accordingly, a value is sometimes transferred from one database record to another database record. Data transfers from the database may, however, occur or be configured to occur at undesirable times.

There is a need for improvements to existing database management systems to achieve improvements over convention databases and database management systems.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
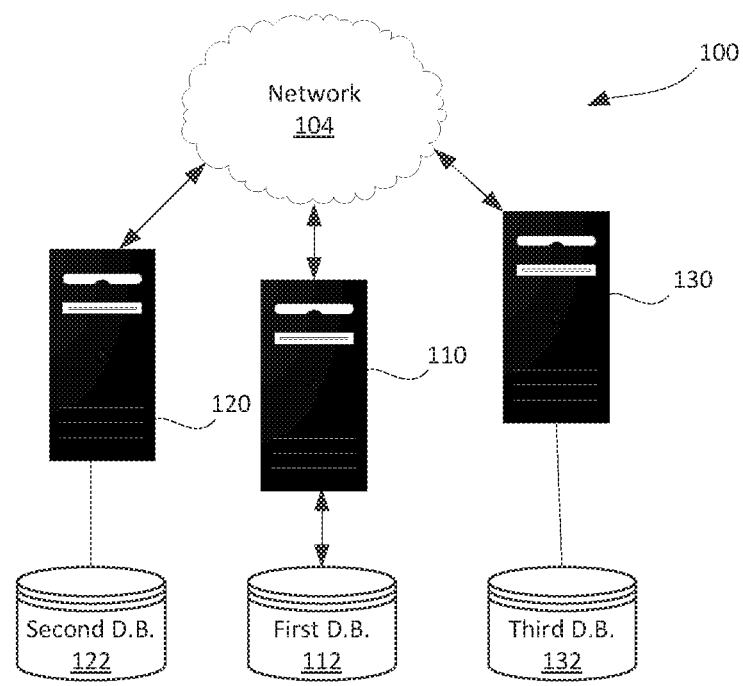
FIG. 1 illustrates a block diagram of an example operating environment of a database management system in accordance with example embodiments of the present disclosure.

The present application describes methods and systems for managing data transfers over a network.

In one aspect, the present application describes an electronic system for managing transfer of data over a network to a recipient system. The electronic system includes a communication interface, a memory storing a schedule of data transfer associated with at least one record in a database, and a processor coupled with the memory and the communication interface. The processor is programmed with processor-executable instructions which, when executed, configure the processor to: receive, via the communication interface, a signal representing an electronic message from a third party system, the electronic message including details of a first scheduled data transfer to a first record in the database at a first transfer time; obtain details of a second scheduled data transfer from the first record to the recipient system; determine that an effect on the first record by the first and second scheduled data transfers meets stored predefined criteria; update the schedule of data transfers to change a second transfer time associated with the second scheduled data transfer; and initiate the second scheduled data transfer according to the updated schedule of data transfers.

In another aspect, the present application describes a method for managing transfer of data over a network to a recipient system. The method may be implemented at a database management system that stores a schedule of data transfers associated with at least one record in a database. The method includes: receiving a signal representing an electronic message from a third party system, the electronic message including details of a first scheduled data transfer to a first record in the database at a first transfer time; obtaining details of a second scheduled data transfer from the first record to the recipient system; determining that an effect on the first record by the first and second scheduled data transfers meets stored predefined criteria; updating the schedule of data transfers to change a second transfer time associated with the second scheduled data transfer; and initiating the second scheduled data transfer according to the updated schedule of data transfers.

In a further aspect, the present application describes an electronic system for managing payment transfers. The electronic system includes a communication interface, a memory storing a schedule of payments associated with at least one record in a database, and a processor coupled with the memory and the communication interface. The processor is programmed with processor-executable instructions which, when executed, configure the processor to: receive, via the communication interface, a signal representing an electronic message from a third party system, the electronic message including details of a first scheduled payment to a first record in the database at a first transfer time; obtain details of a second scheduled payment from the first record to the recipient system; determine that an effect on the first record by the first and second scheduled payments meets stored predefined criteria; update the schedule of payments to change a second transfer time associated with the second scheduled payment; and initiate the second scheduled payment according to the updated schedule of payments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As will be explained in greater detail below, methods and systems are described for managing data transfer timing in a database. For example, the methods and systems may manage transfers from the database so that transfers occur at times when the transfer will not unduly impact a value in the database or will not violate a transfer rule of the database.

The database may, for example, be a database of account records that store a value associated with an account. The value may, for example, represent credit, currency, points, etc. The database may be configured to permit the value to be increased by incoming transfers into the account from another account (which may be another account in the same database or an account in another database).

For example, in an embodiment, the database may be a financial database, such as a banking database, which stores a plurality of records for banking customers. That is, the banking database stores account balances for various accounts associated with customers. The banking database accepts incoming transfers of value into the accounts and allows outgoing transfer of value from the accounts.

As will be described in greater detail below, management systems are described which facilitate the scheduling of outgoing data transfers from an account. For example, the system may schedule outgoing data transfers at times when such data transfers will not unduly impact the value of the account.

Reference is now made to FIG. 1, which illustrates, in block diagram form, an example operating environment 100 of a database management system 110. The database management system 110 is an electronic system for managing data transfer timing in a database. More particularly, the database management system 110 manages data transfer timing in a first database 112. The database management system 110 is coupled with the first database 112 to allow the database management system 110 to access records of the first database 112. For example, the database management system 110 may retrieve data in the first database 112, such as one or more values associated with user records in the first database 112.

In at least some embodiments, the first database 112 is a banking database. The banking database stores account balances (i.e., bank account values) of one or more bank accounts. That is, the banking database stores a value indicative of an account balance on a per-account basis. In such embodiments, the database management system 110 may be referred to as a bank account management system.

The database management system 110 is operated or owned by the same party that operates the first database 112. For example, the database management system 110 and the first database 112 may both be operated by a common financial institution.

The database management system 110 may send and receive signals from other systems or servers by way of a connection which, in the example, is made through a network 104. The network 104 may include public networks (e.g. the Internet), private networks, virtual private networks (VPNs), wired networks, wireless networks, and combinations thereof. At least some of the signals may represent electronic messages.

A third party system 120 may send electronic messages to the database management system 110 through the network 104. The third party system 120 is a distinct system from the database management system 110 and is operated by a third party. That is, the third party system 120 is operated by a party that does not operate the database management system 110 or the first database 112. The third party system 120 is associated with a database which, in the illustrated embodiment, is a second database 122. More particularly, the third party system 120 is associated with at least one record in a database (which may be either the second database 122 or the first database 112), such as an account. The third party system 120 is remotely located from the database management system 110.

While the third party system 120 is associated with the second database 122, it may not operate the second database 122. Rather, the second database 122 may be operated by another party, such as a financial institution. The third party system 120 is associated with the second database since it is associated with a record in that database. More particularly, the third party system 120 owns a value in the second database 122 (e.g., by owning an account) and/or has permission to transfer from a value in the second database (e.g., to transfer at least a portion of the value to another record in the second database or in another database, such as the first database 112). That is, the third party system 120 may affect a value in the second database 122 by transferring at least a portion of the value to another record (e.g., another account) in the second database or in another database but the third party system 120 may not control or operate the second database itself. That is, the third party system 120 cannot control or manage other records not owned or associated with the third party that operates the third party system 120.

In one embodiment, the third party system 120 is a payroll processing system. The payroll processing system processes payment to primary payees, such as employees, contractors or others, by causing the second database 122 to transfer value from an account (which may be referred to as a "payroll processor account") associated with the payroll processing system to another account associated with the party being paid (which may be referred to as a "payee account"). The payroll processing system may also automatically handle remittance payroll deductions (which may be referred to as "remittances"), such as remittances to government organizations for tax (e.g., income tax), employment insurance, public pension plans, etc. The payroll processing system may automatically calculate an amount of remittances and may automatically transfer the amount of the remittances to the appropriate government organization by configuring a transfer of at least a portion of a value in the payroll processor account to the accounts associated with the government organization(s) to which the remittances are directed. The payroll processing system may also automatically calculate a net payment amount that is to be transferred to the primary payee (such as the employee, contractor, etc.) by determining the amount to be paid after the remittances and may automatically configure a data transfer from the payroll processor account to the payee account to occur on a payment date.

Thus, the third party system 120 may configure a transfer of value from one record in a database (e.g., the second database 122) to another record in a database (e.g., the first database 112). To configure the data transfer, the third party system 120 stores, in memory, identification information for the record to which the transfer will be made. For example, the third party system 120 may store information identifying the record that that has a value that will be increased as a result of the data transfer. For example, the third party system 120 may store a record identifier that identifies a specific record that the data transfer is to be made into. The record identifier may be an account number into which a transfer of value is to be made (e.g., the account number of a primary payee). The record identifier is unique within a database.

The third party system 120 may also store a database identifier that identifies a specific database that the transfer is to be made into. The database identifier uniquely identifies the database that will receive a data transfer initiated by the third party system 120 (e.g., the payroll processing system). For example, where payment is to be made into the first database 112, the third party system 120 includes information identifying the first database 112. The database identifier may, for example, include an institution number identifying an institution (such as a financial institution) that operates the database.

The database identifier may be a Business Identifier Code such as a Society for Worldwide Interbank Financial Telecommunication (SWIFT) code which may adhere to a standard format, such as the International Organization for Standardization (ISO) 9362 standard.

Prior to initiating a transfer of value from one record controlled by the third party system 120 to a record in the first database 112, the third party system 120 causes a signal representing an electronic message to be transmitted to the database management system 110 associated with the record receiving the data transfer. The electronic message notifies the database management system 110 of a scheduled data transfer to the first database 112. The electronic message may include information regarding the scheduled data transfer. For example, the electronic message may include a transfer time, value change information, and a record identifier. The record identifier identifies a specific record into which the transfer is to be made. For example, the record identifier may identify an account into which a transfer is to be made.

The transfer time indicates a time in the future when the transfer is expected to occur. For example, the transfer time may indicate a date at which the transfer is scheduled to occur. The transfer time is, in at least some embodiments, at least one day away from the date that the electronic message is sent to the database management system 110. That is, in at least some instances, the third party system 120 may notify the database management system 110 of a scheduled data transfer at least one day before the date at which the data transfer is scheduled. Thus, at least some of the electronic messages sent from the third party system 120 include a transfer time that is at least one day after the date the electronic message is sent.

The value change information included in the electronic message indicates an amount by which a value, in the record specified by the record identifier, is to be changed. For example, the value change information may be a numerical value representing a number that is to be added to a present value in the record when the transfer occurs. The number may represent a number of dollars, points, etc. For example, the number may be a decimal number having two decimal places to represent a number of dollars and cents associated with the data transfer.

When the transfer between records occurs, the record into which the transfer is being made may be adjusted to increase a value by the amount specified in the value change information. Similarly, the record from which the transfer is being made may be adjusted to decrease a value by the amount specified in the value change information. Thus, the transfer is a zero-sum transfer in which the two records affected are adjusted by a corresponding amount.

While the first database 112 (i.e. the database into which a transfer is received) and the second database 122 (i.e. the database from which a transfer is sent) are illustrated as separate databases, they may be a common database in some embodiments. That is, the third party system 120 may rely on the same database (i.e., the first database 112) that is managed by the database management system 110. For example, where the third party system 120 is a payroll processing system and the database management system 110 and first database 112 are operated by a financial institution, the payroll processing system may use an account that is operated by that same financial institution; that is, use an account/record in the first database 112.

Accordingly, a record in the first database 112 may be adjusted when a transfer from another record occurs. That is the value in the record in the first database 112 may be increased due to an incoming transfer. Similarly, the value in that same record may be decreased due to an outgoing transfer. For example, in some embodiments, the value may be decreased when a transfer is made from that record to another record, associated with a recipient. The other record may be stored in a third database 132. However, the record may instead be stored in the first database 112 or the second database 122.

The recipient of the data transfer from the record in the first database 112 may, for example, be a service provider or other bill payee such as, for example, a utility provider (e.g., electricity, natural gas, water, sewage provider), a fitness center, an investment account, a telephone provider, a mobile network operator, an Internet provider, or a provider of another type. Transfers from the record to the recipient (i.e., to a record associated with the recipient) may be scheduled and may, for example, occur regularly. In some instances, a transfer to a particular recipient may occur at a defined period (e.g., monthly), and transfers to that recipient may be for a recurring or similar amount.

The database management system 110 may send electronic messages to a recipient system 130, which is associated with the recipient of a scheduled or expected data transfer, through the network 104. For example, as will be explained in greater detail below the database management system 110 manages the timing of a data transfer from the first database 112 into a record associated with the recipient system 130. If a transfer is to occur from the record in the first database 112 to another record (e.g., a record in the third database 132), the database management system 110 automatically schedules or reschedules the data transfer to avoid or reduce the risk that the data transfer will unduly impact a value in the record in the first database 112 or violate a transfer rule of the first database 112.

In some embodiments, prior to rescheduling the data transfer, the database management system 110 sends a reschedule request to the recipient system 130. The request may specify a transfer time for the data transfer from the record in the first database 112 to the recipient (i.e., to the other record, which may be in the third database). The recipient system 130 receives this request, evaluates it based on predefined criteria, and sends the database management system 110 a response to the request. The response may be an approval message, approving the request or a denial message indicating that the request has not been approved.

When the database management system 110 receives the response, it reschedules the data transfer based on the response. For example, if the response approves the request, it may schedule the data transfer from the record in the first database 112 to occur at the transfer time specified in the message that was sent to the recipient system 130.

Figure 2:
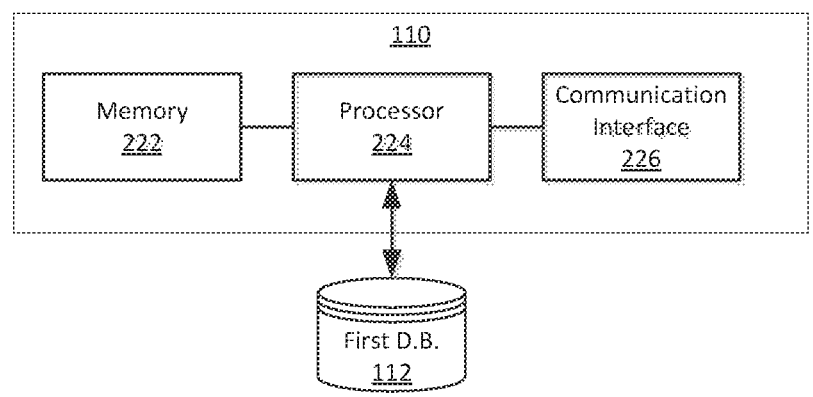
FIG. 2 illustrates a block diagram of an example database and an example database management system in accordance with example embodiments of the present disclosure.

Reference will now be made to FIG. 2 which illustrates, in block diagram form, the first database 112 and the database management system 110. The database management system 110 includes at least one processor 224, memory 222 coupled to the processor 224 and a communication interface 226 coupled to the processor 224. The communication interface 226 may include subsystems for wired or wireless data communication. The communication interface 226 allows the database management system 110 to send and receive electronic messages. For example, the communication interface 226 may allow electronic messages to be sent and received over the network 104 (FIG. 1).

The memory 222 may include volatile and non-volatile memory. At least a part of the memory 222 may store processor-readable instructions that, when executed by the processor, cause the processor 224 to carry out some of the operations described herein.

The processor 224 is also coupled with the first database 112, allowing the processor 224 to retrieve values stored in records in the first database 112.

The database management system 110 includes other components that are not illustrated including, for example, a power source interface. The database management system 110 may also include an output interface such as display (not shown) and/or an input device (not shown) such as a keyboard or mouse.

Figures 3, 4:
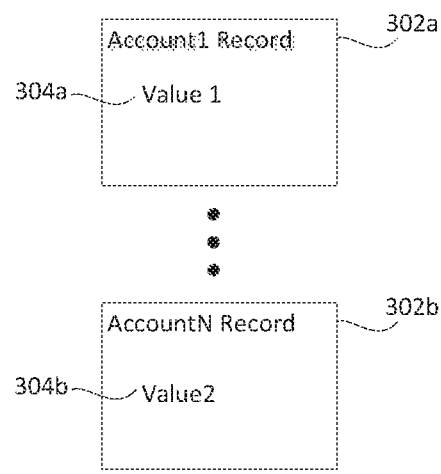
FIG. 3 illustrates, in block form, example records of a database in accordance with example embodiments of the present disclosure.
FIG. 4 illustrates an example data transfer schedule in accordance with example embodiments of the present disclosure.

Referring now to FIG. 3, example records 302a, 302b in the first database 112 (FIGS. 1 and 2) are illustrated. The records 302a, 302b, in the example, are defined on a per-account basis, with a first record 302a being associated with a first account and a second record 302b being associated with a second account. Each record 302a, 302b stores a respective value 304a, 304b—the first record 302a stores a first value 304a and the second record 302b stores a second value 304b.

While FIG. 3 illustrates an embodiment in which each record is associated with a single account, in other embodiments, records may be defined on a per-user or per-customer basis so that a record may be associated with multiple accounts if a the user associated with that record is associated with multiple accounts. By way of example, a record may include a first value associated with a chequing account for a customer and another value associated with a savings account for that customer.

As noted in the discussion above, a database management system 110 is configured to manage data transfer timing in the first database 112. For example, the database management system 110 may manage a schedule for data transfers from the database. Referring now to FIG. 4, an example schedule 402 for data transfers is illustrated. In the example, the schedule 402 is defined on a per-account or per-record basis. That is, the schedule 402 is associated with a particular record and a particular account and involves only transfers from that account/record. However, in other embodiments, the schedule 402 could be defined on a per-user basis or could be defined globally for the database. In such embodiments, each entry 404, 406 in the schedule 402 specifies a transferor identifier, such as an account identifier, which uniquely identifies the transferor.

Each entry 404, 406 in the schedule 402 includes a transfer time. The transfer time is the time is the time at which the data transfer is scheduled to occur. In the example, a first entry 404 indicates a data transfer scheduled for Jan. 1, 2017 and a second entry 406 indicates a further data transfer scheduled for Jan. 3, 2017.

The entries 404, 406 also include respective recipient identifiers, uniquely identifying a recipient of the data transfer. The recipient identifiers may, for example, specify a record identifier for the recipient, such as an account number, and a database identifier for the recipient, such as an institution number or SWIFT number.

The entries 404, 406 also include value change information indicating an amount by which a value in the recipient record will be changed due to the data transfer. In the example, the first entry 404 specifies value change information of $120.00, indicating that a value in a respective recipient's record will be increased by $120.00 while the second entry 406 specifies value change information of $45.00, indicating that a value in the respective recipient's record will be increased by $45.00.

The schedule 402 may be stored in memory 222 (FIG. 2) associated with the database management system 110.

The schedule 402 may be defined, updated or modified based on user input or through automatic scheduling or rescheduling provided by the database management system 110 itself. For example, the schedule 402 may, in some embodiments, be modified or created based on user input. A user associated with a record, such as an account holder, may input a command to schedule a data transfer from the record. By way of example, the user may input such a command through a web interface or through an application operating on a device such as a mobile application operating on a mobile device. The user may define an amount associated with the data transfer and a date for the data transfer. In response to receiving this user input, the schedule 402 may be created or updated to reflect the inputted information. A confirmation number for the transfer may also automatically be generated and provided to the user through a user interface through which the user input the command to schedule the data transfer.

The database management system 110 may itself create, add to, or modify the schedule 402. That is, the database management system 110 may adjust the schedule without direct user input. For example, the database management system 110 may select a date for a data transfer without direct user input specifying the date. Rather, as will be described below, the database management system 110 may select the date based, at least in part, on timing information specified in a received electronic message from a third party system 120 (FIG. 1) notifying the database management system 110 of an incoming data transfer to a record associated with the schedule 402.

In at least some embodiments, the database management system 110 may automatically modify a user-created entry in the schedule 402 based on the timing information in the received electronic message from the third party system 120. For example, if a user schedules a data transfer for a transfer time but, based on the timing information in the message received from the third party system 120, the database management system 110 determines that that transfer time does not meet certain defined criteria, then the database management system 110 may reschedule the data transfer for another transfer time. The defined criteria may, for example, specify that a value in the record is not to fall below a certain threshold. For example, the defined criteria may specify that the value in the record is not to fall below zero. If the database management system 110 determines that the user-scheduled transfer time will cause the value to fall below the threshold, then it may automatically reschedule the data transfer.

Figure 5:
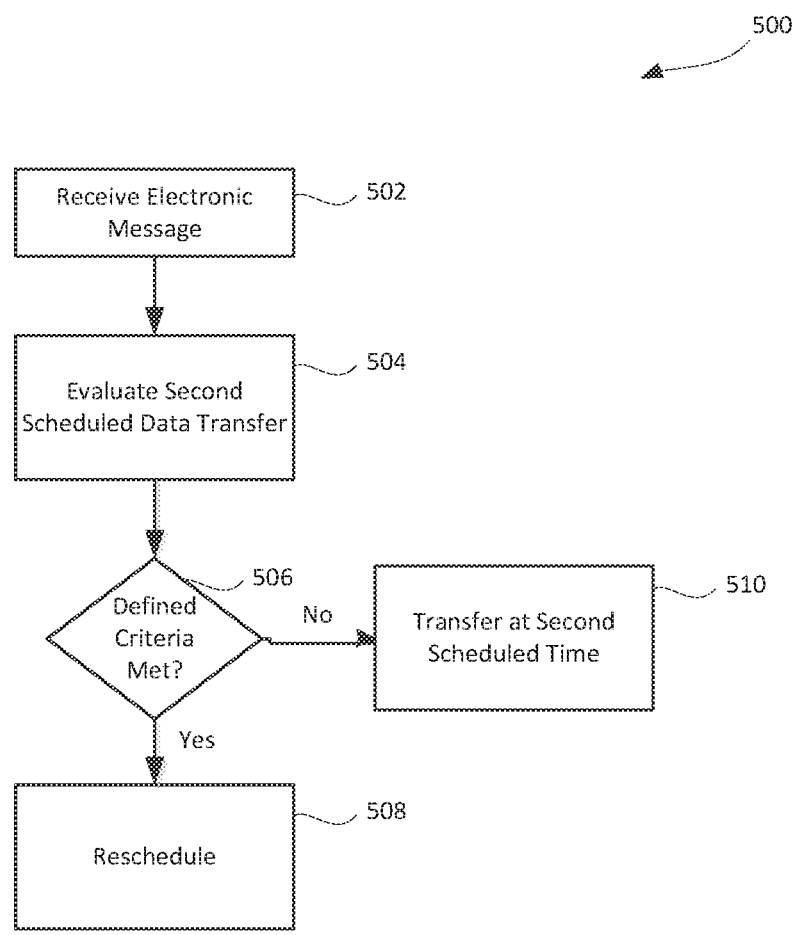
FIG. 5 is a flowchart of an example method of managing data transfer timing in accordance with example embodiments of the present disclosure.

Reference will now be made to FIG. 5 which illustrates an example embodiment of a method 500 for managing data transfer timing in a database. The method 500 may be performed by the database management system 110. For example, a processor 224 (FIG. 2) associated with the database management system 110 may perform the method 500. The processor may be programmed with processor-executable instructions which, when executed, configure the processor to perform the method 500.

At operation 502, the database management system 110 receives, via the communication interface 226 (FIG. 2), a signal representing an electronic message. The electronic message is sent from a third party system 120 (FIG. 1) and may be received through a network 104 (FIG. 1). The electronic message notifies the database management system 110 of a first scheduled data transfer to a database managed by the database management system 110; for example, the first database 112 illustrated in FIG. 1.

The electronic message received at the database management system 110 includes value change information that affects a value in the database managed by the database management system 110. The electronic message is associated with a first transfer time, which is a time in the future at which the first scheduled data transfer is expected to occur. The first transfer time may be specified in the electronic message itself or it may be determined, by the database management system 110 based on a predefined time period. The predefined time period may, for example, define an amount of time that typically elapses between receipt of electronic messages of the type received in operation 502 and the occurrence of the data transfer associated with such electronic messages. The predefined time may, for example, be determined based on historical time periods between such electronic messages and such data transfers. In some instances, the first transfer time may be one or more days away from the day the electronic message is received at operation 502.

The first transfer time may, in some embodiments, be specified as a range of times. For example, the first transfer time may specify a minimum expected time at which the data transfer is expected to occur and a maximum expected time at which the data transfer is expected to occur.

The value change information included in the electronic message specifies an amount associated with a data transfer. For example, the value change information may be a decimal number indicating an amount by which a value in the database will be increased due to the data transfer.

The electronic message may also include a record identifier which uniquely identifies, within the first database 112, a record which will be affected by the data transfer. That is, the record identifier identifies the record that will receive the data transfer and whose value will be increased.

As noted above, in some embodiments, the database management system 110 may be operated by a financial institution which provides a first database 112 which is a banking database. In such embodiments, the record identifier may be an account identifier such as an account number and the value change information may indicate the amount of a financial transfer such as the number of dollars and cents that will be transferred into the account represented by the account identifier. In some such embodiments, the third party system 120 may be a payroll processing system which processes a payment to the account associated with the account identifier. The payroll processing system may send the electronic message to the database management system 110 to provide the database management system 110 with advance warning of a data transfer to an account in the database management system 110.

In response to receipt of the electronic message, at operation 504, the database management system 110 evaluates a second scheduled data transfer from the first database 112 to a recipient. The second scheduled data transfer is an expected data transfer at a second transfer time in the future from the record associated with the record identifier included in the electronic message to a record associated with a recipient. More particularly, at the second transfer time, at least a portion of a value of the database is expected to be transferred to a record associated with the recipient. This record (i.e., the record to which the second scheduled data transfer is directed) may be referred to as a recipient record or a recipient.

The first scheduled data transfer and the second scheduled data transfer both affect a common record (e.g., both affect a common account). However, the first scheduled data transfer represents an incoming transfer to the record while the second scheduled data transfer represents an outgoing transfer from the data record. Consequently, the first scheduled data transfer represents a data transfer that will increase the value in the record while the second scheduled data transfer represents a data transfer that will decrease the value in that record.

The second scheduled data transfer may be evaluated based on defined criteria. The defined criteria may, for example, specify that a value in the record is not to fall below a certain threshold, which may be referred to as a minimum value. The minimum value may be zero in some embodiments.

The database management system 110 may, at operation 504, determine an effect on the value in the record by the second scheduled data transfer at the second transfer time. For example, the database management system 110 may determine if the second scheduled data transfer is expected to cause the value to fall below the threshold. In doing so, the database management system 110 may also consider the effect of the first scheduled data transfer on the value. If the value is expected to drop below the threshold due to the second scheduled data transfer, then the defined criteria may be determined (at operation 506) to be met while if the value is not expected to drop below the threshold, then the defined criteria may be determined not to be met.

If, at operation 506, the database management system 110 determines that the defined criteria is not met (e.g., if the value will not fall below the minimum value as a result of the second scheduled data transfer), then the database management system 110 may not reschedule the data transfer. Thus, at operation 510, the second data transfer occurs at the second scheduled time. That is, the data transfer occurs at the time at which it was previously scheduled to occur.

If, however, at operation 506, the database management system 110 determines that the defined criteria is met (e.g., if the value will fall below the minimum value if the second scheduled data transfer were to occur as scheduled), then the database management system 110 may reschedule the second scheduled data transfer at operation 508.

The second scheduled data transfer may be rescheduled, in at least some embodiments, by updating a schedule 402, such as a schedule 402 of the type described above with reference to FIG. 4. The second scheduled data transfer may be rescheduled to a third transfer time which the database management system 110 selects based on defined rules. For example, the database management system 110 may select a third transfer time which is later than the second transfer time, so as to delay the data transfer. The database management system 110 may select the third transfer time based on the first transfer time. That is, the database management system 110 may select a third transfer time that is after the first transfer time. That is, it is after the transfer time when the incoming data transfer to the record is expected to occur. In some embodiments, the database management system 110 may select the third transfer time to be shortly after the first transfer time. For example, in some embodiments, the third transfer time may be selected to be within a day of the first transfer time. In some embodiments, the third transfer time may be selected to be within a week of the first transfer time.

Accordingly, in response to the receipt of the electronic message at operation 502, the database management system 110 may automatically reschedule the second scheduled data transfer to a third transfer time.

As described above, in response to receiving notification of a first scheduled data transfer, the database management system 110 may evaluate a second scheduled data transfer to determine whether the second scheduled data transfer should be rescheduled. The second scheduled data transfer may be a data transfer that was previously configured by a user associated with a record, such as an owner of a bank balance represented by a value in the record. The second scheduled data transfer may be defined in a schedule 402 (FIG. 4) that represents one or more data transfers previously configured by the user. In such embodiments, during operation 504, the database management system 110 may retrieve the schedule 402 to identify the second scheduled data transfer. Thus, the database management system 110 may evaluate data transfers that were previously configured by a user directly.

In some embodiments, during the method 500 of FIG. 5, the database management system 110 may consider a scheduled data transfer that has not been defined in a schedule, but which is nevertheless expected to occur. For example, the database management system 110 may identify data transfer trends to identify an expected data transfer. For example, the database management system 110 may be configured to identify expected data transfers based on historical data transfer logs for the database. The historical data transfer logs identify past data transfers from the record identified in the electronic message received at operation 502. The historical data transfer logs specify prior transfer times of data transfers from the database to recipients and associated recipient information and value information indicating an amount associated with the prior data transfers. The database management system 110 parses this information to identify an expected future data transfer. More particularly, the database management system 110 identifies an expected recipient of a future data transfer, an expected amount associated with that data transfer and also an expected transfer time associated with that data transfer. Thus, the database management system 110 may be configured to identify a second transfer time for an expected future data transfer. This identification is performed prior to evaluating the second scheduled data transfer at operation 504. Then, operation 504 may be performed based on the identified second transfer time and the expected amount, as determined from the historical data transfer logs.

By way of example, in some embodiments, the database management system 110 may identify an expected day of the month for a data transfer to the recipient based on one or more previous days of prior months on which a transfer from the database to that recipient occurred. For example, where data transfers have historically occurred on a particular day of the month (e.g., on the $10^{th}$ day of each month), the database management system 110 may determine that a data transfer to the recipient is likely to occur on this date.

The expected amount associated with the second data transfer may be determined by the database management system 110 based on the amount in the most recent data transfer to the recipient of the second data transfer. For example, if the most recent amount was $45.00, then the database management system 110 may conclude that the expected amount of an expected data transfer is also $45. In other embodiments, other criteria may be used to determine the expected amount. For example, in some embodiments, the expected amount may be determined as the mean of the amounts of prior data transfers to that recipient. In some embodiments, the expected amount may be determined as a trimmed mean of the amounts of prior data transfers to that recipient.

Figure 6:
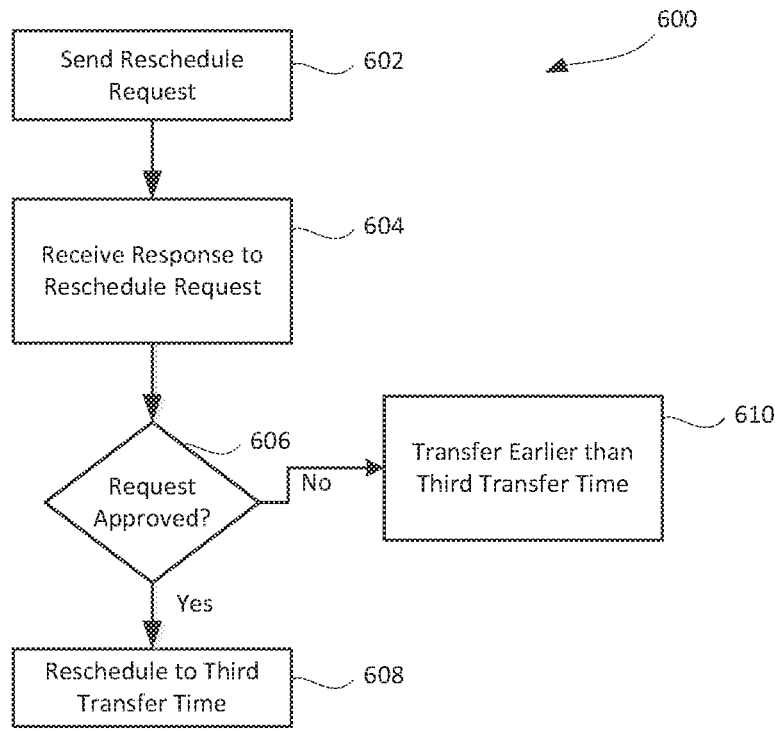
FIG. 6 is a flowchart of an example method of rescheduling a data transfer in accordance with example embodiments of the present disclosure.

In at least some embodiments, the database management system 110 may not unilaterally reschedule the second data transfer at operation 508. Instead, the database management system 110 may seek approval from the recipient of that second data transfer prior to rescheduling. Referring now to FIG. 6, an example of one such embodiment is illustrated. FIG. 6 illustrates a flowchart of an example method 600 of selectively rescheduling a data transfer. The method 600 may be performed by the database management system 110 at operation 508 of the method 500 of FIG. 5.

At operation 602, the database management system 110 sends a reschedule request to a system associated with the recipient of the second scheduled data transfer. For example, the database management system 110 may send a reschedule request to the recipient system 130 (FIG. 1) via a network 104. The reschedule request may include a proposed transfer time, which may be referred to as a third transfer time. The third transfer time is later than the second transfer time. That is, the third transfer time is later than the transfer time at which the second scheduled data transfer is currently expected to occur. Techniques for selecting the third transfer time are described above.

The recipient system 130 is configured to evaluate received reschedule requests based on predefined criteria and send the database management system 110 a response to the request. The response may be an approval message, approving the request or a denial message indicating that the request has not been approved. This denial message may also be referred to as a denial of request message or a refusal.

The response to the reschedule request is received at the database management system 110 at operation 604 and is evaluated by the database management system 110 at operation 606. More particularly, at operation 606, the database management system 110 determines whether the request was approved or whether it was denied.

When the response indicates that the request was approved by the recipient system 130, the database management system 110 reschedules the data transfer to the third transfer time.

If, however, the response indicates that the request was denied by the recipient system 130, the database management system 110 does not reschedule the data transfer to the third transfer time. Rather, the database management system 110 schedules the transfer to occur at a time that is earlier than the third transfer time. For example, in some embodiments, the database management system 110 schedules the transfer to occur at the second transfer time and, at operation 610, the transfer occurs at this time.

In some embodiments, other actions may be taken in response to receiving a denial message. For example, in some embodiments, when the denial message is received, the database management system 110 may attempt to reschedule another scheduled data transfer from the database to a further recipient. This further scheduled data transfer may be referred to as a third scheduled data transfer. That is, the database management system 110 may identify another outgoing data transfer from the same record to a different recipient and may follow the method 600 to attempt to attempt to reschedule this other outgoing data transfer.

While not illustrated in FIG. 5 or FIG. 6, in at least some embodiments, the database management system 110 may notify a user, such as an account-holder, when data transfers from a record associated with that user (e.g., from the user's account) are rescheduled or automatically scheduled by the databased management system 110. Such notification may occur by way of an electronic message, such as an email message.

Figure 7:
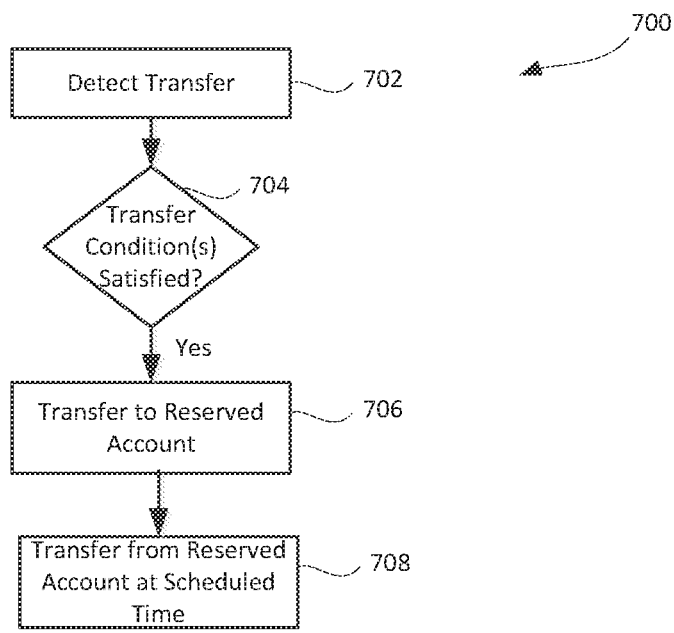
FIG. 7 is a flowchart of an example method of managing a data transfer using a reserved account in accordance with example embodiments of the present disclosure.

Reference will now be made to FIG. 7 which illustrates an example method 700 of managing a data transfer using a reserved account. The method 700 may be performed by the database management system 110. For example, a processor 224 (FIG. 2) associated with the database management system 110 may perform the method 700. The processor may be programmed with processor-executable instructions which, when executed, configure the processor to perform the method 700.

At operation 702, the database management system 110 detects an incoming transfer to a database. For example, the database management system 110 may detect a first scheduled data transfer to the database. More particularly, the database management system 110 detects that a value of a record in the database has been increased as a result of the first scheduled data transfer. For example, the database management system 110 may determine that a value representing an account balance has increased through a data transfer. The data transfer may be a payroll data transfer processed by a payroll processing system.

In response to detecting the first scheduled data transfer to the database, the database management system 110 determines, at operation 704, whether one or more transfer conditions are satisfied. For example, the database management system 110 may determine that an outgoing data transfer from the record is scheduled within a defined time period following the transfer that was detected in operation 702. For example, in one embodiment, the database management system 110 may determine that a scheduled data transfer is to occur within 2 weeks. In some embodiments, the time period that is used in operation 704 may depend upon a period of incoming data transfers for the account. For example, the time period may depend on a pay period which is the amount of time between payroll payments. In such embodiments, at operation 704, the database management system 110 determines whether an outgoing data transfer is to occur before an expected next pay date.

Thus, in at least some embodiments, at operation 704, the database management system 110 identifies scheduled data transfers within a certain time period. The identification of data transfers may be in the manner described above with reference to FIG. 5. For example, in some embodiments, a schedule 402 may be consulted and, in some embodiments, the database management system 110 may identify expected data transfers based on historical information regarding past data transfers.

If the transfer condition(s) are satisfied (e.g., if an outgoing data transfer is to occur during the defined time period), then the database management system 110 may, at operation 706, automatically transfer at least a portion of the value in the record to a reserved portion of the database, such as a reserved account. The reserved account may be a restricted access account which has greater restrictions than an account into which the incoming data transfer was received. The reserved account may, for example, only permit its value to be used for certain defined purposes. For example, the reserved account may only permit data transfers to recipients of scheduled data transfers. In some embodiments, the reserved account may only permit outgoing data transfers for payment of bills. Data transfers for other purposes may be restricted.

The amount that is transferred to the reserved account at operation 706 may be an amount that is equal to the total outgoing data transfers during the defined time period used in the evaluation at operation 704. For example, if the time period is based on a pay period of one month, an amount sufficient to cover expected outgoing payments during that pay period may be transferred to the reserved account. If a transfer to a recipient is expected to occur during the time period, then the portion of the value that is expected to be transferred to the recipient is transferred at operation 706 to the reserved account.

After an amount is transferred to the reserved account, at operation 708, transfers may be made from that reserved account at the scheduled times.

The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

The invention claimed is:

1. An electronic system for managing transfer of data over a network to a recipient system, the electronic system comprising:
   a communication interface;
   a memory storing a schedule of data transfers associated with at least one record in a database and criteria relating to data requirements for the at least one record; and
   a processor coupled with the memory and the communication interface, the processor programmed with processor-executable instructions which, when executed, configure the processor to:
      receive, via the communication interface, a signal representing an electronic message from a third-party system, the electronic message including details of a first scheduled data transfer to a first record in the database at a first transfer time;
      obtain details of a second scheduled data transfer from the first record to the recipient system;
      determine that an effect on a value associated with the first record by the first and second scheduled data transfers meets criteria defined for the first record in the stored criteria; and
      in response to determining that the effect on the value meets the criteria:
         update the schedule of data transfers to change a second transfer time associated with the second scheduled data transfer; and
         initiate the second scheduled data transfer according to the updated schedule of data transfers.

2. The electronic system of claim 1, wherein obtaining details of the second scheduled data transfer comprises:
identifying the second transfer time based on a historical data transfer log for the database, the historical data transfer log including one or more prior transfer times of data transfers from the database to the recipient system.

3. The electronic system of claim 1, wherein the second scheduled data transfer from the first record to the recipient system is defined in the schedule of data transfers, the schedule representing one or more data transfers previously configured by an owner of a balance represented by a value associated with the first record.

4. The electronic system of claim 1, wherein updating the schedule of data transfers comprises:
sending a reschedule request to the recipient system;
receiving a response to the reschedule request; and
based on the response, scheduling a data transfer of at least a portion of a value associated with the first record to the recipient system at a third transfer time that is later than the second transfer time.

5. The electronic system of claim 4, wherein the reschedule request specifies the third transfer time.

6. The electronic system of claim 1, wherein updating the schedule of data transfers comprises:
sending a reschedule request to the recipient system, the reschedule request specifying a third transfer time;
receiving, from the recipient system, a denial of request message; and
in response to receiving the denial of request message, scheduling a transfer of at least a portion of a value associated with the first record to the recipient system at a time that is earlier than the third transfer time.

7. The electronic system of claim 1, wherein updating the schedule of data transfers comprises:
sending a reschedule request to the recipient system, the reschedule request specifying a third transfer time;
receiving, from the recipient system, a denial of request message; and
in response to receiving the denial of request message, rescheduling a third scheduled data transfer from the first record to a further recipient.

8. The electronic system of claim 1, wherein the instructions further configure the processor to:
detect the first scheduled data transfer to the first record; and
in response to detecting the first scheduled data transfer, transfer a portion of a value that is expected to be transferred to the recipient system to a reserved portion of the database, the reserved portion of the database restricting use of the transferred portion of the value.

9. The electronic system of claim 1, wherein the first scheduled data transfer and the second scheduled data transfer comprise payment transfers.

10. The electronic system of claim 9, wherein the database comprises a banking database, and the third-party system comprises a payroll processing system which processes payments that are made into the database.

11. A method for managing transfer of data over a network to a remote recipient system, the method implemented at a database management system that stores a schedule of data transfers associated with at least one record in a database and criteria relating to data requirements for the at least one record, the method comprising:
receiving a signal representing an electronic message from a third-party system, the electronic message including details of a first scheduled data transfer to a first record in the database at a first transfer time;
obtaining details of a second scheduled data transfer from the first record to the recipient system;
determining that an effect on a value associated with the first record by the first and second scheduled data transfers meets criteria defined for the first record in the stored criteria; and
in response to determining that the effect on the value meets the criteria:
updating the schedule of data transfers to change a second transfer time associated with the second scheduled data transfer; and
initiating the second scheduled data transfer according to the updated schedule of data transfers.

12. The method of claim 11, wherein obtaining details of the second scheduled data transfer comprises:
identifying the second transfer time based on a historical data transfer log for the database, the historical data transfer log including one or more prior transfer times of data transfers from the database to the recipient system.

13. The method of claim 11, wherein the second scheduled data transfer from the first record to the recipient system is defined in the schedule of data transfers, the schedule representing one or more data transfers previously configured by an owner of a balance represented by a value associated with the first record.

14. The method of claim 11, wherein updating the schedule of data transfers comprises:
sending a reschedule request to the recipient system;
receiving a response to the reschedule request; and
based on the response, scheduling a data transfer of at least a portion of a value associated with the first record to the recipient system at a third transfer time that is later than the second transfer time.

15. The method of claim 14, wherein the reschedule request specifies the third transfer time.

16. The method of claim 11, wherein updating the schedule of data transfers comprises:
sending a reschedule request to the recipient system, the reschedule request specifying a third transfer time;
receiving, from the recipient system, a denial of request message; and
in response to receiving the denial of request message, scheduling a transfer of at least a portion of a value associated with the first record to the recipient system at a time that is earlier than the third transfer time.

17. The method of claim 11, wherein updating the schedule of data transfers comprises:
sending a reschedule request to recipient system, the reschedule request specifying a third transfer time;
receiving, from the recipient system, a denial of request message; and
in response to receiving the denial of request message, rescheduling a third scheduled data transfer from the first record to a further recipient.

18. The method of claim 11, wherein the first scheduled data transfer and the second scheduled data transfer comprise payment transfers.

19. The method of claim 18, wherein the database comprises a banking database, and the third-party system comprises a payroll processing system which processes payments that are made into the database.

20. An electronic system for managing payment transfers, the electronic system comprising:
a communication interface;

a memory storing a schedule of payments associated with at least one record in a database and criteria relating to data requirements for the at least one record; and a processor coupled with the memory and the communication interface, the processor programmed with processor-executable instructions which, when executed, configure the processor to:

receive, via the communication interface, a signal representing an electronic message from a third-party system, the electronic message including details of a first scheduled payment to a first record in the database at a first transfer time;

obtain details of a second scheduled payment from the first record to the recipient system;

determine that an effect on an account balance associated with the first record by the first and second scheduled payments meets criteria defined for the first record in the stored criteria; and in response to determining that the effect on the account balance meets the criteria:

update the schedule of payments to change a second transfer time associated with the second scheduled payment; and initiate the second scheduled payment according to the updated schedule of payments.

* * * * *